April 6, 1937.  K. A. ZIMMERER ET AL  2,076,422
APPARATUS FOR PREVENTING BEER SETTLING
Filed Feb. 28, 1936

INVENTOR
Karl A. Zimmerer,
William G. Koerber,
BY
ATTORNEYS

Patented Apr. 6, 1937

2,076,422

UNITED STATES PATENT OFFICE 2,076,422

APPARATUS FOR PREVENTING BEER SETTLING

Karl A. Zimmerer and William G. Koerber, Detroit, Mich., assignors to Karl A. Zimmerer Manufacturing Company, Inc., Detroit, Mich., a corporation of Michigan Application February 28, 1936, Serial No. 66,202

6 Claims. (Cl. 204—26)

The present invention relates to apparatus for drawing beer from a keg or other container and constitutes an improvement on the device disclosed in the co-pending application of William G. Koerber, Serial No. 50,823, filed November 21, 1935.

When draught beer is stored at some distance from the dispensing faucet it is well known that the pipes spanning the distance, known as the coil, become coated with a sediment, caused by the settling of the heavier particles in the beer and the deposition of said particles on the walls of the coil. These particles, if allowed to accumulate, soon impart a sour taste to the beer passing therethrough and the common practice is to disconnect the coil from the dispensing faucet and container and to clean it about once every week, but it can be readily understood that the quality of the beer becomes adulterated from the day the coil is cleaned until the next cleaning and the sour taste becomes progressively worse during that period.

The primary object of the present invention is to provide means for maintaining the inside of the coil clean continuously so that the beer dispensed at the faucet has the same quality and taste that it had when it left the container. As in the application above referred to, this invention contemplates subjecting the coil and the beer contained therein to an electric current in such manner that the heavier particles in the beer will not deposit themselves on the walls of the coil but will pass therethrough. More specifically, this invention aims to provide for better distribution of the electric current through the beer whereby to more effectively prevent the deposit of the heavier particles contained in the beer on the walls of the coil.

Another object of the present invention is to provide means for automatically interrupting the electric current in a device of the character above referred to so as to prevent the development of heat which might tend to change the character of the beer contained in the coil. This function is especially important when the beer dispensing operations have been stopped for the night or when the beer is being dispensed at a comparatively slow rate.

With the above and other ends in view the invention is more fully disclosed with reference to the accompanying drawing, in which Figure 1 is a diagrammatic illustration of the present dispensing equipment;

Like characters of reference are employed throughout to designate corresponding parts.

Figure 2:
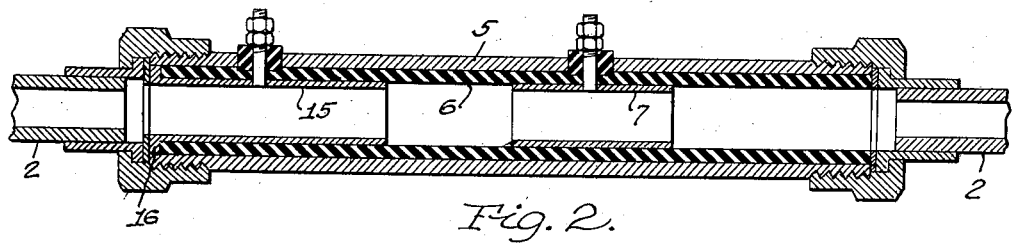
Fig. 2 is a longitudinal section through a pipe section.

The numeral 1 designates a dispensing faucet attached to a coil 2, preferably formed of block tin, which is known to be a conductor of electricity. The other end of the coil 2 is connected to a beer container 3 by an insulating connection 4. Interposed in the coil 2 at some suitable point is a coil section 5 having an insulating body 6 disposed internally thereof and extending throughout the entire length thereof. Within the insulating element 6 and insulated thereby from the body 5 and both sections of the coil 2 is a terminal 7 which is preferably made of silver. The terminal 7 is connected by a lead wire 8 to an electrically operated circuit control device 9, having operating connections 10 with a supply source 11, the control device functioning to control the flow of current through the transformer 12 and line 13 to the switch 14 which it operates to intermittently connect the line 13 with the line 8. A second terminal 15 is disposed within the insulating body 6 with its end 16 in contact with the adjacent end of the coil section 2. The terminal 15 is connected by the lead wire 17 to the transformer 12.

In operation a low voltage current is intermittently supplied to the terminals 7 and 15, the flow of the current being controlled by the timing apparatus 9. The current flows through the liquid in the coil from the terminal 7 to the terminal 15 and inasmuch as the coil 2 is in electrical contact with the terminal 15 the current also flows through the coil sections 2 and through the liquid therein back to the terminals.

Figure 3:
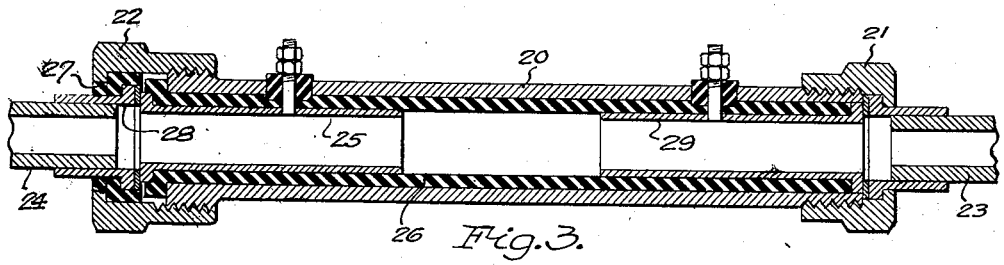
Fig. 3 is a longitudinal section through a modified form of pipe section.
Figure 1:
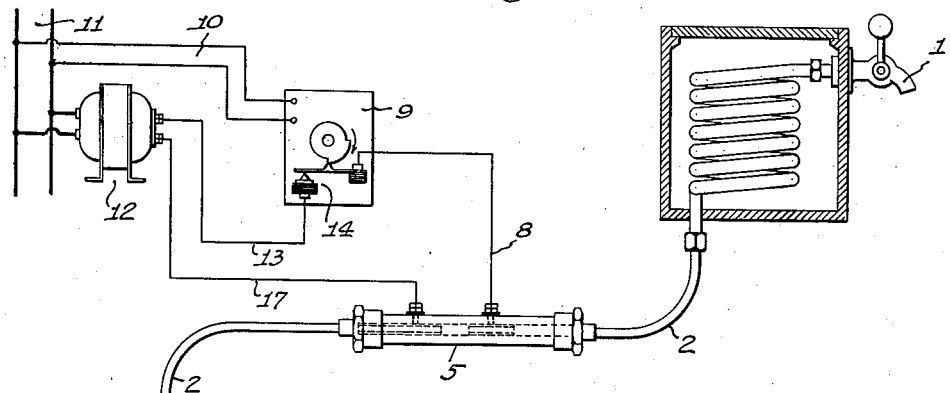

Referring to Fig. 3 there is illustrated a coil section 20 having coupling elements 21 and 22 connecting opposite ends thereof to coil sections 23 and 24 respectively. Within the section 20 is provided a terminal 25 preferably formed of silver and insulated with respect to the section 20 by the insulating material 26. Between the coupling 22 and the coil section 24 is provided insulation 27 and a current conductor 28 has one end in engagement with the coil section 24 and its other end in electrical contact with the terminal 25. Adjacent to the other end of the section 20 is another terminal 29 having its end 20 in electrical contact with both the coil section 23 and the section 20. In operation electrical current is supplied to the terminals 25 and 29 in the above described manner.

Figure 4:
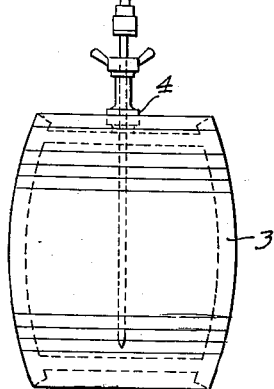
Figs. 4 and 5 are sectional views showing a modified form of terminal.
Figure 4:
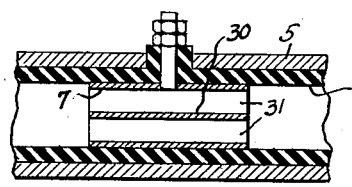
Figure 5:
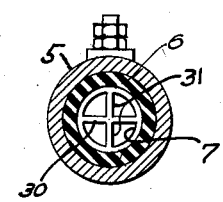

Figs. 4 and 5 illustrate a modified construction of a terminal which is provided with partition walls 30 and 31 diametrically disposed within the terminal and formed integral with the walls thereof. This construction provides increased surface exposure to the liquid passing through said terminal thereby providing a freer passage of the electric current to the liquid whereby a more effective cleaning action of the coil is obtained. The current permeates all parts of the liquid in the terminal.

Although specific embodiments of the invention have been illustrated and described it will be understood that various changes may be made in the details of construction without departing from the spirit of the invention and such changes are contemplated.

What we claim is:—

1. In beer dispensing apparatus, and in combination, a storage container, a dispensing means remote from said container, a conduit connecting said container and dispensing means for the flow of beer from the former to the latter, said conduit including a pair of internal tubular electrodes located in succession within and forming wall sections of the beer flow path, said electrodes being spaced apart and insulated from each other with at least one of the electrodes insulated from the conduit, and means for connecting said electrodes with a source of electrical energy to place the electrodes as terminals of opposite sign, whereby completion of the circuit is through the content of the conduit and in the direction of flow of such content.

2. Apparatus as in claim 1 characterized in that the means leading from the electrical source to the terminals includes a timing make and break device effective to render said means active at timed intervals.

3. Apparatus as in claim 1 characterized in that the conduit includes a removable section carrying an insulating inner wall, said electrodes being carried internally of and being supported by said insulating wall, whereby the flow path within the section will present its wall as of metallic form spaced by an insulating zone.

4. Apparatus as in claim 1 characterized in that the electrodes are carried by an insulating wall with the electrodes carried at end zones of the insulating wall.

5. Apparatus as in claim 1 characterized in that the electrodes are carried by an insulating wall with one of the electrodes carried at an end zone of such insulating wall and with the other electrode carried remote from the opposite end of such wall.

6. Apparatus as in claim 1 characterized in that at least one of the electrodes is of internal cellular form with each cell open-ended in the direction of length of the electrode.

KARL A. ZIMMERER.
WILLIAM G. KOERBER.